US011544213B2

(12) United States Patent
Kim et al.

(10) Patent No.: US 11,544,213 B2
(45) Date of Patent: Jan. 3, 2023

(54) NEURAL PROCESSOR

(71) Applicants: SAMSUNG ELECTRONICS CO., LTD., Suwon-si (KR); SNU R&DB FOUNDATION, Seoul (KR)

(72) Inventors: Dongyoung Kim, Suwon-si (KR); Jung Ho Ahn, Seoul (KR); Sunjung Lee, Seoul (KR); Jaewan Choi, Incheon (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/369,298

(22) Filed: Jul. 7, 2021

(65) Prior Publication Data
US 2022/0283984 A1    Sep. 8, 2022

(30) Foreign Application Priority Data

Mar. 4, 2021   (KR) .................. 10-2021-0028932
Mar. 19, 2021  (KR) .................. 10-2021-0036051

(51) Int. Cl.
*G06F 15/80*   (2006.01)
*G06F 9/30*    (2018.01)
*G06N 3/063*   (2006.01)

(52) U.S. Cl.
CPC ........ *G06F 15/8046* (2013.01); *G06F 9/3001* (2013.01); *G06N 3/063* (2013.01)

(58) Field of Classification Search
None
See application file for complete search history.

(56) References Cited

U.S. PATENT DOCUMENTS

| 10,192,162 | B2 | 1/2019 | Thorson et al. | |
| 2019/0188237 | A1* | 6/2019 | Chen | G06N 3/04 |
| 2019/0370631 | A1* | 12/2019 | Fais | G06F 8/31 |
| 2020/0175363 | A1 | 6/2020 | Lin et al. | |
| 2020/0250520 | A1 | 8/2020 | Ross et al. | |
| 2020/0410333 | A1* | 12/2020 | Das | G06F 7/5443 |

(Continued)

FOREIGN PATENT DOCUMENTS

| CN | 110785778 A | 2/2020 |
| KR | 10-2019-0055248 A | 5/2019 |
| KR | 10-2020-0019736 A | 2/2020 |

(Continued)

OTHER PUBLICATIONS

Kung, H.T. Packing Sparse Convolutional Neural Networks for Efficient Systolic Array Implementations Column Combining Under Joint Optimization, 2019, ACM, pp. 821-834. (Year: 2019).*

(Continued)

*Primary Examiner* — Eric Coleman
(74) *Attorney, Agent, or Firm* — NSIP Law

(57) ABSTRACT

A neural processor is provided. The neural processor includes a matrix device which is configured to generate an output feature map by processing a standard convolution operation and which has a systolic array architecture, and accelerators with an adder-tree structure which are configured to process depth-wise convolution operations for each of elements of the output feature map corresponding to lanes of the matrix device.

18 Claims, 12 Drawing Sheets

(56) References Cited

U.S. PATENT DOCUMENTS

2021/0064992 A1* 3/2021 Park .................. G06N 3/04

FOREIGN PATENT DOCUMENTS

| KR | 10-2127524 B1 | 6/2020 | |
|----|----|----|----|
| WO | WO 2020/051816 A1 | 3/2020 | |
| WO | WO-2020051816 A1 * | 3/2020 | ......... G06K 9/00268 |

OTHER PUBLICATIONS

Cho, Seunghwan, et al. "Mcdram v2: In-dynamic random access memory systolic array accelerator to address the large model problem in deep neural networks on the edge." IEEE Access 8 (2020) (21 pages in English).

Chen, Yu-Hsin, et al. "Eyeriss v2: A flexible accelerator for emerging deep neural networks on mobile devices." IEEE Journal on Emerging and Selected Topics in Circuits and Systems 9.2 (2019) (21 pages in English).

Bai, Lin, Yiming Zhao, and Xinming Huang. "A CNN accelerator on FPGA using depthwise separable convolution." IEEE Transactions on Circuits and Systems II: Express Briefs 65.10 (2018) (5 pages in English).

Kwon, Hyoukjun, Ananda Samajdar, and Tushar Krishna. "Maeri: Enabling flexible dataflow mapping over dnn accelerators via reconfigurable interconnects." ACM SIGPLAN Notices 53.2 (2018) (15 pages in English).

* cited by examiner

Tiled IFmap for DW-CONV
(Results of previous PW-CONV)  Weight      Tiled OFmap

FIG.9A

| Cycle | 0 | 1 | 2 | 3 | 4 | 5 | 6 | 7 | 8 | 9 | 10 | 11 | 12 | 13 | 14 | 15 | 16 |
|-------|---|---|---|---|---|---|---|---|---|---|----|----|----|----|----|----|----|
| IN    | 0 | 1 | 2 | 3 | 4 | 5 | 6 | 7 | 8 | 9 | 10 | 11 | 12 | 13 | 14 | 15 |    |
| OUT   |   |   |   |   |   |   | 0 | 1 | 2 |   | 3  | 4  | 5  |    | 6  | 7  | 8  |

FIG.9B

NEURAL PROCESSOR

CROSS-REFERENCE TO RELATED APPLICATIONS

This application claims the benefit under 35 U.S.C. § 119(a) of Korean Patent Application No. 10-2021-0028932 filed on Mar. 4, 2021, and Korean Patent Application No. 10-2021-0036051 filed on Mar. 19, 2021, in the Korean Intellectual Property Office, the entire disclosures of which are incorporated herein by reference for all purposes.

BACKGROUND

1. Field

The following description relates to a neural processor.

2. Description of Related Art

A convolutional neural network (CNN) accelerator may be an accelerator that processes an inference through a convolution operation, and may process, for example, both a standard convolution operation and a depth-wise convolution operation with a matrix unit that includes multiple multipliers and adders.

When both the standard convolution operation and the depth-wise convolution operation are processed by the matrix unit, a relatively high on-chip memory bandwidth may be necessary in comparison to an accelerator that performs only the standard convolution operation. When the size of output feature maps generated based on the standard convolution operation is greater than a capacity of an on-chip memory, power consumption may increase due to an access to a dynamic random-access memory (DRAM). Additionally, due to characteristics of a mobile device, a bandwidth of the DRAM may be limited. When an access to the DRAM occurs, a processing time may increase due to a bottleneck of the bandwidth of the DRAM.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a neural processor includes a matrix device configured to generate an output feature map by processing a standard convolution operation, the matrix device configured to have a systolic array architecture; and accelerators, configured to process depth-wise convolution operations for each of elements of the output feature map corresponding to lanes of the matrix device.

The output feature map generated by the standard convolution operation may be provided as an input to the accelerators in a pipelined manner to perform the depth-wise convolution operations.

Each of the accelerators may be configured to perform the depth-wise convolution operations in parallel for each of the elements of the output feature map that are output for each of the lanes corresponding to columns of the matrix device.

The accelerators may be configured to operate by implementing a lockstep scheme of processing a same set of operations at a same time in parallel.

The accelerators may respectively correspond to the lanes of the matrix device.

Each of the accelerators may include a plurality of multipliers; a plurality of depth-wise input feature map buffers, configured to store the output feature map for the depth-wise convolution operations; and a depth-wise weight buffer, configured to store weights for the depth-wise convolution operations.

The plurality of multipliers may be configured to perform a multiplication operation for the depth-wise convolution operations based on the output feature map received from the plurality of depth-wise input feature map buffers and the weight received from the depth-wise weight buffer; and transmit a result of the multiplication operation to first adders included in the adder-tree structure.

Each of the accelerators may further include a second adder, configured to collect a multiplication operation result of the plurality of multipliers; and a latch, configured to store values collected in the second adder.

The plurality of depth-wise input feature map buffers may be configured to be one-to-one connected to the plurality of multipliers.

The depth-wise weight buffer may be configured to read the weights directly from a memory through a memory interface and to simultaneously store and process the weights by a double buffering scheme.

The depth-wise weight buffer may include a barrel shifter, configured to shift a position of the weights, and the depth-wise weight buffer may be configured to map an element of the output feature map and an element of the weights to the plurality of multipliers with the barrel shifter.

The neural processor may further include an accumulator, configured to store the elements of the output feature map generated by the matrix device.

The matrix device may further include a postprocessing module, configured to perform at least one postprocessing among an activation operation, a normalization operation, and a pooling operation on the elements of the output feature map.

The accelerators may be configured to have an adder-tree structure.

In a general aspect, a processor-implemented neural network method includes generating, with a matrix device having a systolic array architecture, an output feature map by processing a standard convolution operation; processing, with accelerators, depth-wise convolution operations for each of elements of the output feature map corresponding to lanes of the matrix device; and providing the generated output feature map as an input to the accelerators to perform the depth-wise convolution operations.

The depth-wise convolution operations may be processed with adders included in an adder tree structure of the accelerators.

The depth-wise convolution operations may be processed in parallel for each of the elements of the output feature map that are output for each of the lanes corresponding to columns of the matrix device.

The method may include performing at least one postprocessing operation among an activation operation, a normalization operation, and a pooling operation on the elements of the output feature map.

Other features and aspects will be apparent from the following detailed description, the drawings, and the claims.

BRIEF DESCRIPTION OF DRAWINGS

FIGS. 9A to 9C illustrates an example operation of a depth-wise processing element DwPE, in accordance with one or more embodiments.

Figure 1:
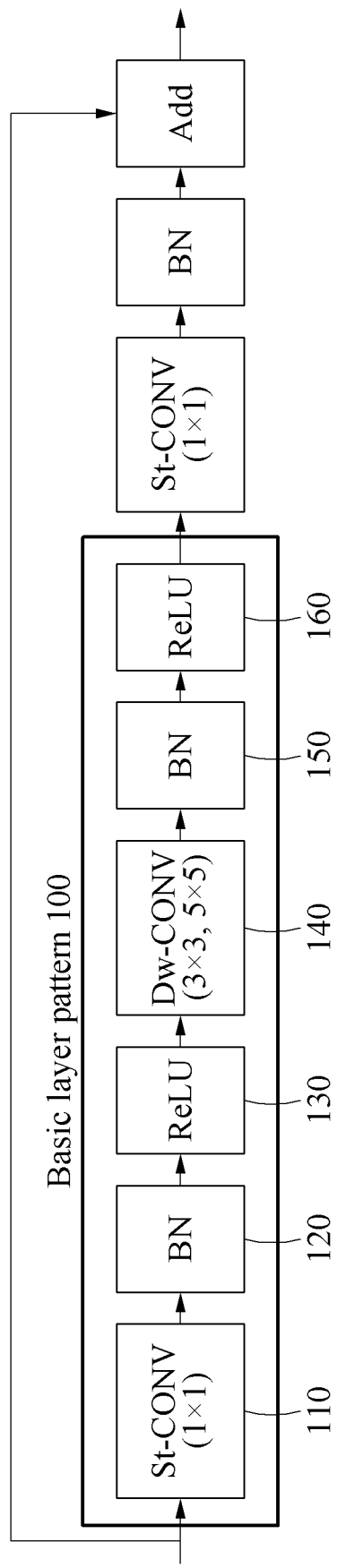
FIG. 1 illustrates an example basic layer pattern of an example convolutional neural network (CNN) model, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. Regarding the reference numerals assigned to the components in the drawings, it should be noted that the same components will be designated by the same reference numerals, and redundant descriptions thereof will be omitted.

FIG. 1 illustrates an example of a basic layer pattern of an example convolutional neural network (CNN) model, in accordance with one or more embodiments. FIG. 1 illustrates a basic layer pattern 100 with a repetitive layer structure that performs a standard convolution St-CONV operation and a depth-wise convolution Dw-CONV operation.

As non-limiting examples, a mobile device and an edge device may be common platforms for inferring a CNN.

The basic layer pattern 100 of the CNN model may use a new type of layer, such as a depth-wise convolution Dw-CONV layer, to reduce a computational cost of a convolution CONV operation. Generally, an accelerator for a CNN may be optimized primarily for a layer (for example, a standard convolution St-CONV layer) that performs a computationally intensive standard convolution operation with abundant data reuse that may be pipelined with activation and normalization operations.

As illustrated in FIG. 1, the basic layer pattern 100 may have a repetitive layer structure in which layers are repeated in an order of a standard convolution St-CONV layer 110, a batch normalization (BN) layer 120, a rectified linear unit (ReLU) layer 130, a depth-wise convolution Dw-CONV layer 140, a BN layer 150, and a ReLU layer 160.

The standard convolution St-CONV layer 110 may correspond to a layer that processes a standard convolution operation.

The BN layers 120 and 150 may correspond to layers that perform normalization on a convolution operation result to prevent an output of a distribution changed through re-centering and re-scaling.

The ReLU layers 130 and 160 may correspond to activation functions that solve a problem in that a variation of a result value is minimized despite an extremely great variation in an input value of a first layer, and may activate a result of normalization performed through the BN layers 120 and 150.

The depth-wise convolution Dw-CONV layer 140 may correspond to a layer that processes a depth-wise convolution operation. The depth-wise convolution operation may require a wide bandwidth of the on-chip memory, due to a large number of times data is fetched from an on-chip memory (for example, a static random-access memory (SRAM) or a scratchpad) in comparison to computational complexity in the depth-wise convolution operation among various types of convolution operations. In an example, when a matrix device processes a standard convolution operation and a depth-wise convolution operation together, it may be difficult to supply an input to a multiplier due to a structural limitation such as a bandwidth of an on-chip memory, which may lead to a decrease in utilization of a multiplier-and-accumulator (MAC). The depth-wise convolution operation may be an independent operation for each channel, and accordingly a reusability of an input feature map may decrease.

In an example, a standard convolution operation and a depth-wise convolution operation may be processed at a matrix device having a systolic array architecture, and a separate vector computation device, respectively, instead of being processed at a single matrix device.

In an example, a throughput and computation for an on-chip memory may be efficiently provided through the vector computation device according to a characteristic of a depth-wise convolution operation that requires a wide bandwidth, thereby enhancing performance of a neural processor by eliminating a bottleneck of a bandwidth of the on-chip memory.

In an example, output feature maps generated through the standard convolution operation may be directly used as input feature maps for the depth-wise convolution operation, and the standard convolution operation and the depth-wise convolution operation may be nearly simultaneously processed in a pipelined manner, and thus it is possible to reduce power consumption according to storage and/or an access to a dynamic random-access memory (DRAM). Hereinafter, examples of a structure and an operation of a neural processor including a matrix device and a vector computation device will be described with reference to drawings.

Figure 2:
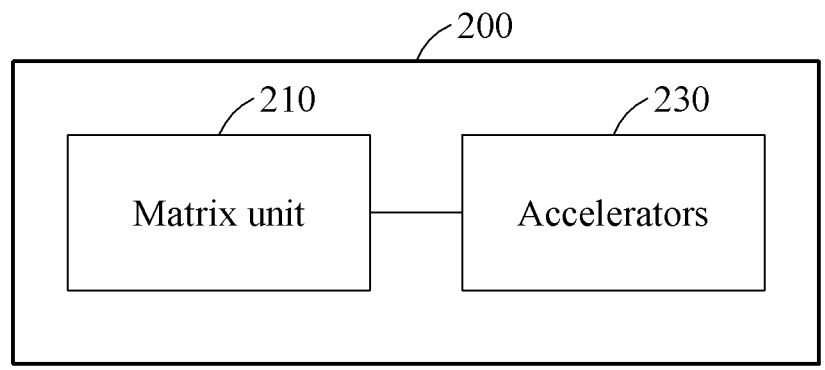
FIG. 2 illustrates an example configuration of an example neural processor, in accordance with one or more embodiments.

FIG. 2 illustrates an example of a configuration of an example neural processor, in accordance with one or more embodiments. FIG. 2 illustrates an example neural processor 200 including a matrix device 210 and accelerators 230.

The matrix device 210 may process a standard convolution operation. The matrix device 210 may have a systolic array architecture that processes a standard convolution operation and generates an output feature map, or a modified systolic array architecture. The systolic array architecture may correspond to a structure designed so that cells having the same function form a connection network and perform a single operation according to an entire synchronization signal. The output feature map generated by the standard convolution operation of the matrix device 210 may be provided as an input to the accelerators 230 in a pipelined manner for a depth-wise convolution operation.

The accelerators 230 may form a single depth-wise convolution device or unit DwCU that processes a systolic array architecture-based depth-wise convolution operation. The accelerators 230 may correspond to a set of depth-wise processing elements DwPE. In the following description, a "vector device", a "vector computation device" and "accelerators" may be understood to have the same meaning. Also, an "accelerator" and a "depth-wise processing element DwPE" may be understood to have the same meaning.

An example of a structure of the neural processor 200 including the matrix device 210 and the accelerators 230 will be further described below with reference to FIG. 3.

The accelerators 230 may have an adder-tree structure that processes depth-wise convolution operations for each of elements of an output feature map received from the matrix device 210 corresponding to lanes of the matrix device 210. Each of the accelerators 230 may perform depth-wise convolution operations in parallel for each of the elements of the output feature map output for each of lanes corresponding to columns of the matrix device 210. The accelerators 230 may respectively correspond to the lanes of the matrix device 210.

The matrix device 210 may generate a value of a channel of a single output feature map for each column. An example of the lanes of the matrix device 210 will be further described below with reference to FIG. 4.

Figure 3:
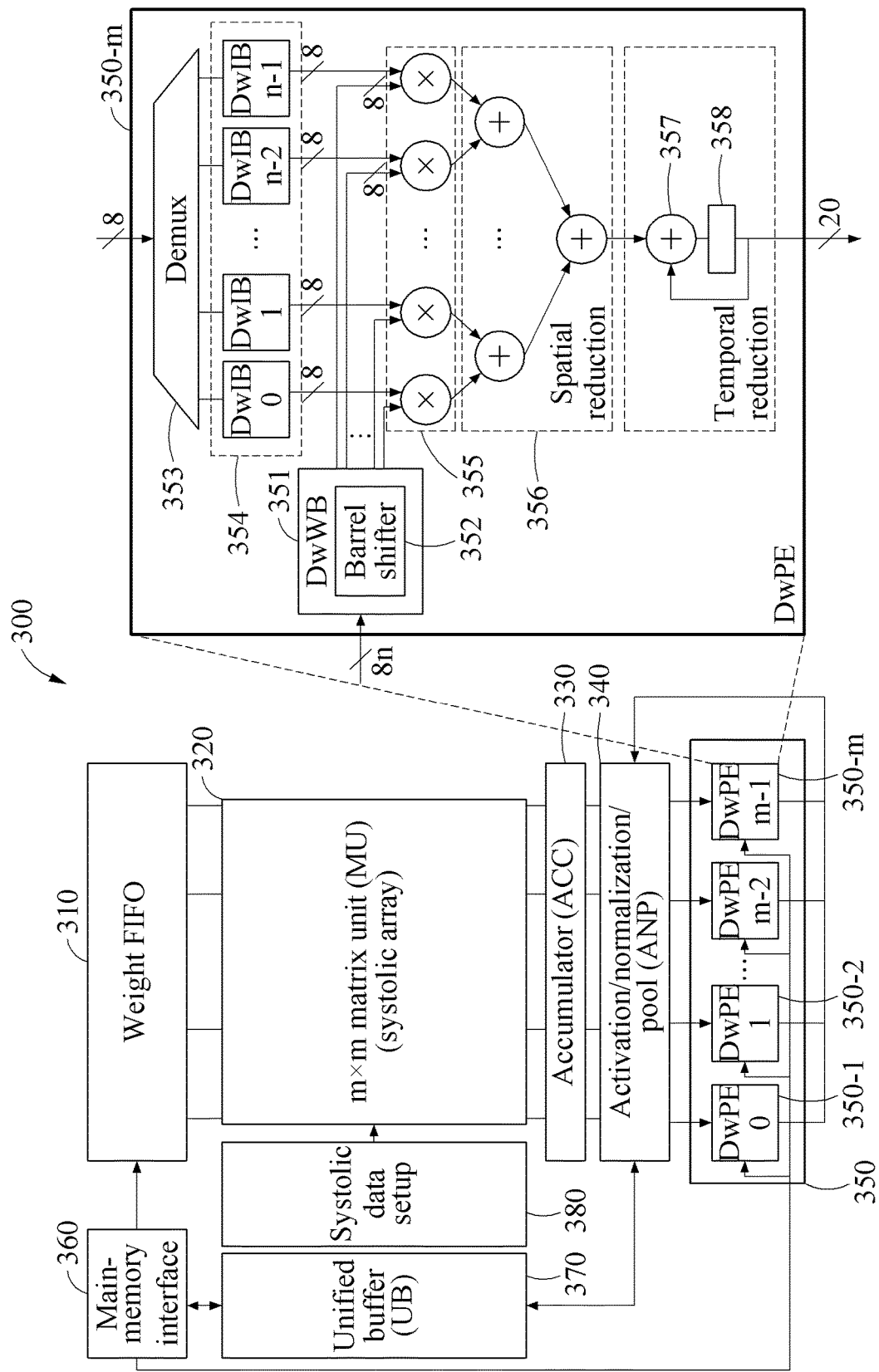
FIG. 3 illustrates an example structure of an example neural processor, in accordance with one or more embodiments.

FIG. 3 illustrates an example structure of an example neural processor. FIG. 3 illustrates a neural processor 300 that includes a matrix device MU 320 with a systolic array architecture, and accelerators 350 (hereinafter, referred to as an "accelerator set DwCU 350").

The neural processor 300 may include a weight first-in first-out (FIFO) buffer 310, the matrix unit or device MU 320, an accumulator ACC 330, an activation/normalization/pooling module 340 (hereinafter, referred to as an "ANP module 340"), the accelerators 350, a main-memory interface 360, a unified buffer (UB) 370, and a systolic data setup module 380. The ANP module or device 340 may also be referred to as a "postprocessing module" in that the ANP module 340 performs a function operation corresponding to postprocessing, such as activation, normalization and/or pooling.

The neural processor 300 may provide the matrix unit or device MU 320 with an input feature map and a weight that are read from a DRAM through the main-memory interface 360 for each cycle. The term "cycle" used herein may be understood to refer to a clock cycle or a period.

The neural processor 300 may store the input feature map received through the main-memory interface 360 in the UB 370, and may provide the input feature map to the matrix device MU 320 through the systolic data setup module 380 according to the systolic array architecture. The neural processor 300 may provide the matrix device MU 320 with the weight received through the main-memory interface 360, through the weight FIFO 310.

The matrix device MU 320 may have the systolic array architecture.

The matrix device MU 320 may process a standard convolution operation using the input feature map provided through the systolic data setup module 380 according to the systolic array architecture of the matrix device MU 320, and using the weight provided through the weight FIFO buffer 310. The matrix device MU 320 may generate an output feature map by processing the standard convolution operation.

The output feature map that is a result of the standard convolution operation processed by the matrix device MU 320 may be sequentially added in the accumulator ACC 330. The neural processor 300 may perform a function operation corresponding to postprocessing, such as activation, normalization and/or max pooling, on elements of the output feature map sequentially added in the accumulator ACC 330, according to an artificial intelligence (AI) algorithm.

The neural processor 300 may store a result obtained by performing postprocessing on the elements of the output feature map in the ANP module 340 in the UB 370, and may apply the result as an input to the accelerators 350. The accelerators 350 and the UB 370 may be bidirectionally connected.

The accelerator set DwCU 350 may perform a depth-wise convolution operation based on a fact that a pair of a channel of an input feature map and a channel of an output feature map is formed and does not have an influence on channels at other positions. In the systolic array architecture, a value of a channel of a single output feature map may be generated for each column when a standard convolution operation is processed. In an example, as shown in FIG. 3, "m" elements of the output feature map may be output as a result from the matrix device MU 320 with a size of "m x m" and may be stored in the accumulator ACC 330. Each of columns of the matrix device MU 320 may be defined as a lane. The accelerator set DwCU 350 may be disposed after the accumulator ACC 330 or the ANP module 340. An example of the lanes of the matrix device MU 320 will be further described below with reference to FIG. 4.

Hereinafter, an example of a structure and an operation of an accelerator DwPEm-1 350-m included in the accelerator set DwCU 350 will be described. A structure and an operation of an accelerator DwPE may also be applicable to the other accelerators included in the accelerator set DwCU 350.

The accelerator DwPE may correspond to a component configured to perform a depth-wise convolution operation. The accelerator DwPE may include a buffer and may maximally reuse a convolution to prevent a feature map from being repeatedly read.

The accelerator DwPEm 350-m may include a single depth-wise weight buffer DwWB 351, a demultiplexer (De-MUX) 353, "n" depth-wise input feature map buffers DwWB 354, "n" multipliers 355, an adder tree 356, and an adder 357 and a latch 358 for accumulation. The depth-wise weight buffer DwWB 351 may include a barrel shifter 352. The adder tree 356 may be used for a spatial reduction. Also, the adder 357 and the latch 358 for accumulation may be used for a temporal reduction.

The depth-wise weight buffer DwWB 351 may be a buffer configured to store a weight of a depth-wise convolution, and may read a weight directly from a DRAM through the main-memory interface 360 and store the weight. The weight may be transferred to an appropriate multiplier among the "n" multipliers 355 through the barrel shifter 352.

The depth-wise weight buffer DwWB 351 may process a depth-wise convolution without a stall during an operation of different types of channels or layers by simultaneously storing and processing the weight by implementing a double buffering scheme. The double buffering scheme may be a scheme of storing and processing data at the same time. In an example, an input channel may store data in a first buffer while a processor is processing data of a second buffer.

In an example, a weight element one-to-one mapped to an element of a feature map repeatedly used in a depth-wise convolution may frequently change based on a position of a sliding window ("convolution window") for a convolution. This is because a pattern in which a position changes in a sliding scheme is simple, from left to right or from top to bottom. In an example, a position of a weight stored in the depth-wise weight buffer DwWB 351 may be shifted by the barrel shifter 352, and accordingly an input element and a weight element used for a multiplication operation may be simply mapped.

The DeMUX 353 may select elements of a feature map input to each of the depth-wise input feature map buffers DwIB 354.

The depth-wise input feature map buffers DwIB 354 may be a buffer configured to store a feature map input to an individual accelerator (for example, the accelerator DwPEm 350-m), that is, store an output feature map of the matrix device MU 320, and the same number of depth-wise input feature map buffers DwIB 354 as a number (for example, "n") of multipliers in the individual accelerator may be distributed and disposed.

The depth-wise input feature map buffers DwIB 354 may store an input feature map of a depth-wise convolution. The depth-wise input feature map buffers DwIB 354 may have an on-chip bandwidth corresponding to [n×bit-width/cycle].

The depth-wise input feature map buffers DwIB 354 may be configured with a distributed scratchpad memory architecture to maximize a bandwidth of an on-chip memory. In general, by allowing a storage to be distributed, a bandwidth of an on-chip memory may be efficiently used. However, if data is not properly stored in the distributed storage, the bandwidth may not be completely utilized, or an input feature map may be repeatedly stored in the depth-wise input feature map buffers DwIB 354 due to repetition caused by a sliding window scheme. Since a depth-wise convolution operation has a predetermined pattern with a simple read and write scheme, the depth-wise convolution operation may be used even in the distributed scratchpad memory architecture without difficulty.

In an example, the "n" depth-wise input feature map buffers DwIB 354 may be one-to-one connected to the "n" multipliers 355, and thus use of wires may be minimized and a gain may be obtained from an overall throughput without a need to increase a bandwidth of an individual on-chip memory.

The "n" multipliers 355 may receive a weight from one depth-wise weight buffer DwWB 351, may receive input feature maps from the "n" depth-wise input feature map buffers DwIB 354, and may perform a multiplication operation of a depth-wise convolution. The input feature maps received from the "n" depth-wise input feature map buffers DwIB 354 may correspond to output feature maps of the matrix unit or device MU 320.

The "n" multipliers 355 may transfer a result of the multiplication operation of the depth-wise convolution to the adder tree 356. The adder tree 356, the adder 357 and the latch 358 may function to collect values of multiplications performed by the "n" multipliers 355 for multiple cycles. The latch 358 may store values collected in the adder 357.

A final result obtained after an operation is finished in the accelerator DwPEm 350-m may be postprocessed in the ANP module 340 and may then be stored in the UB 370.

A total number of multipliers included in the accelerator set DwCU 350 may be a value obtained by multiplying a number of multipliers "n" included in each accelerator DwPE by a number "m" of accelerators DwPE.

In an example, depth-wise convolution operations performed after a standard convolution operation may be nearly simultaneously processed in a pipelined manner, and accordingly an output feature map of the standard convolution operation may be used directly as an input feature map of a depth-wise convolution, without a need to be separately stored in a DRAM. In an example, power consumption for storage and/or an access to a DRAM may be stored, and accordingly the neural processor 300 may be applied to a mobile/embedded system, a computing system sensitive to an on-chip memory bandwidth and power usage, and/or a computing system sensitive to an execution time. Additionally, in an example, a quality of service (QoS) may be guaranteed by reducing an inference execution time in an accelerator system that simultaneously processes different types of convolution operations.

Figure 4:
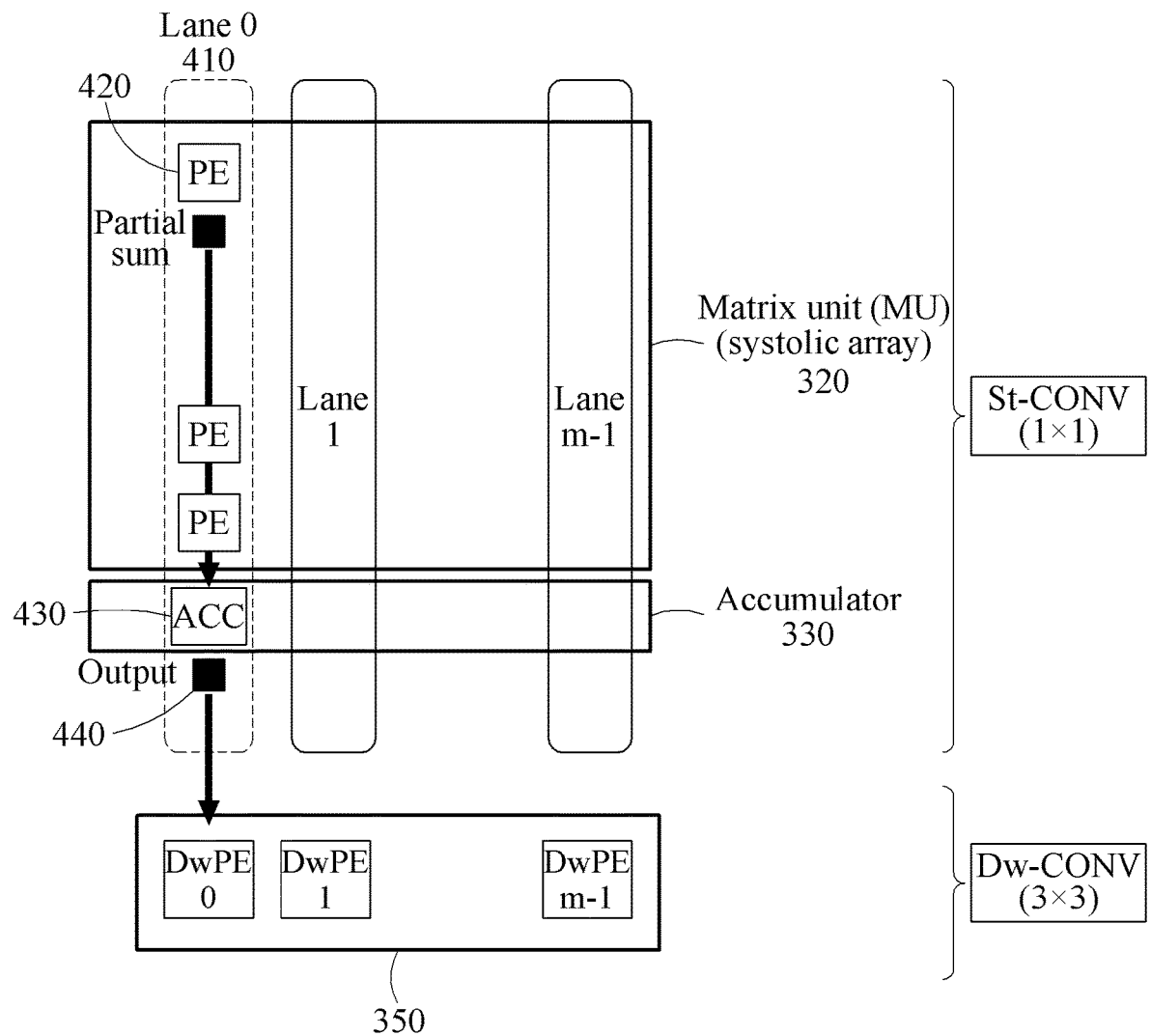
FIG. 4 illustrates an example of lanes of a matrix unit, in accordance with one or more embodiments.

FIG. 4 illustrates an example of lanes of a matrix unit or device. A matrix unit or device MU 320 with a size of "m×m" may be assumed to include "m" lanes, as shown in FIG. 3.

The same number of accelerators (for example, accelerators DwPE 0 350-1, DwPE 1 350-2, DwPE m-2, and DwPE m-1 350-m as illustrated in FIG. 3) as a number (for example, "m" that is a natural number greater than "1") of lanes of the matrix unit MU 320 may be assigned to an accelerator set DwCU 350.

In an example, for a pipeline of a standard convolution operation and a depth-wise convolution operation, an accelerator DwPE may be disposed in each of lanes of a systolic array. In an example, in a lane 0 410 of the matrix unit MU 320, a standard convolution operation, for example, a partial sum, may be performed by a plurality of processing elements (PEs) 420. A result obtained by performing the standard convolution operation may be accumulated in an accumulator ACC 330 and transferred as an output feature map 440 to an accelerator DwPE 0 included in the accelerator set DwCU 350. Each of the accelerators included in the accelerator set DwCU 350 may perform, in parallel, depth-wise convolution operations on an output feature map output from each of lanes of the matrix unit MU 320.

Figure 5A:
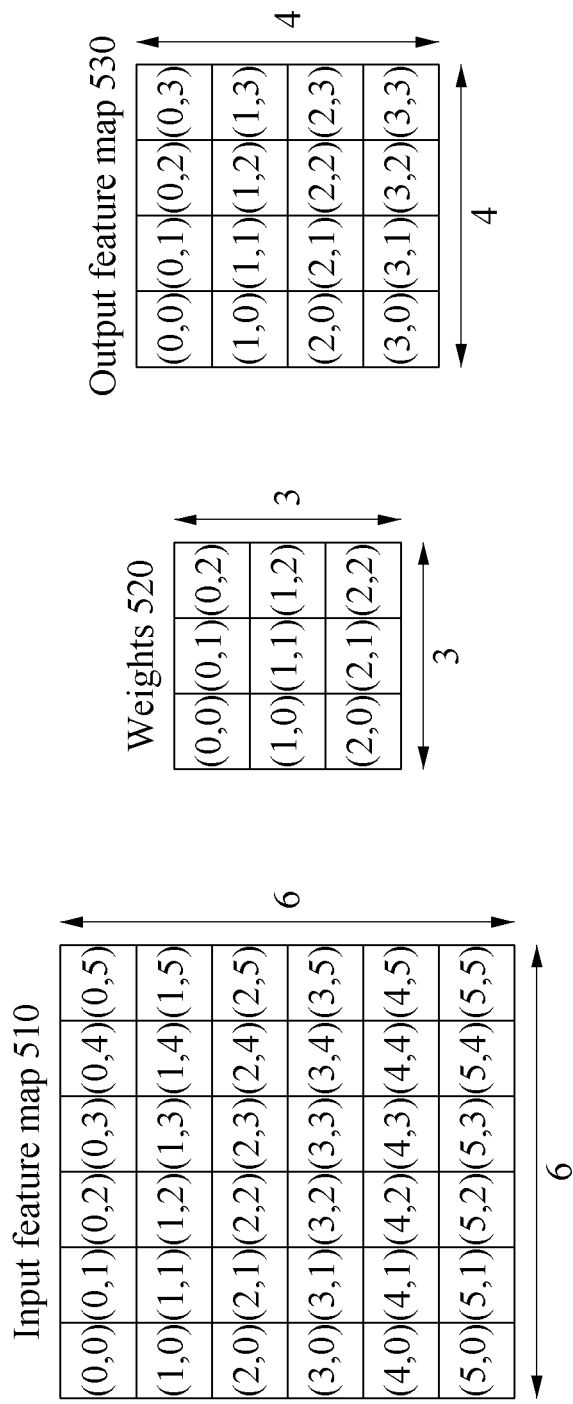
FIGS. 5A and 5B illustrate examples process of storing an input feature map in a depth-wise weight buffer DwIB during a depth-wise convolution operation, in accordance with one or more embodiments.
Figure 5B:
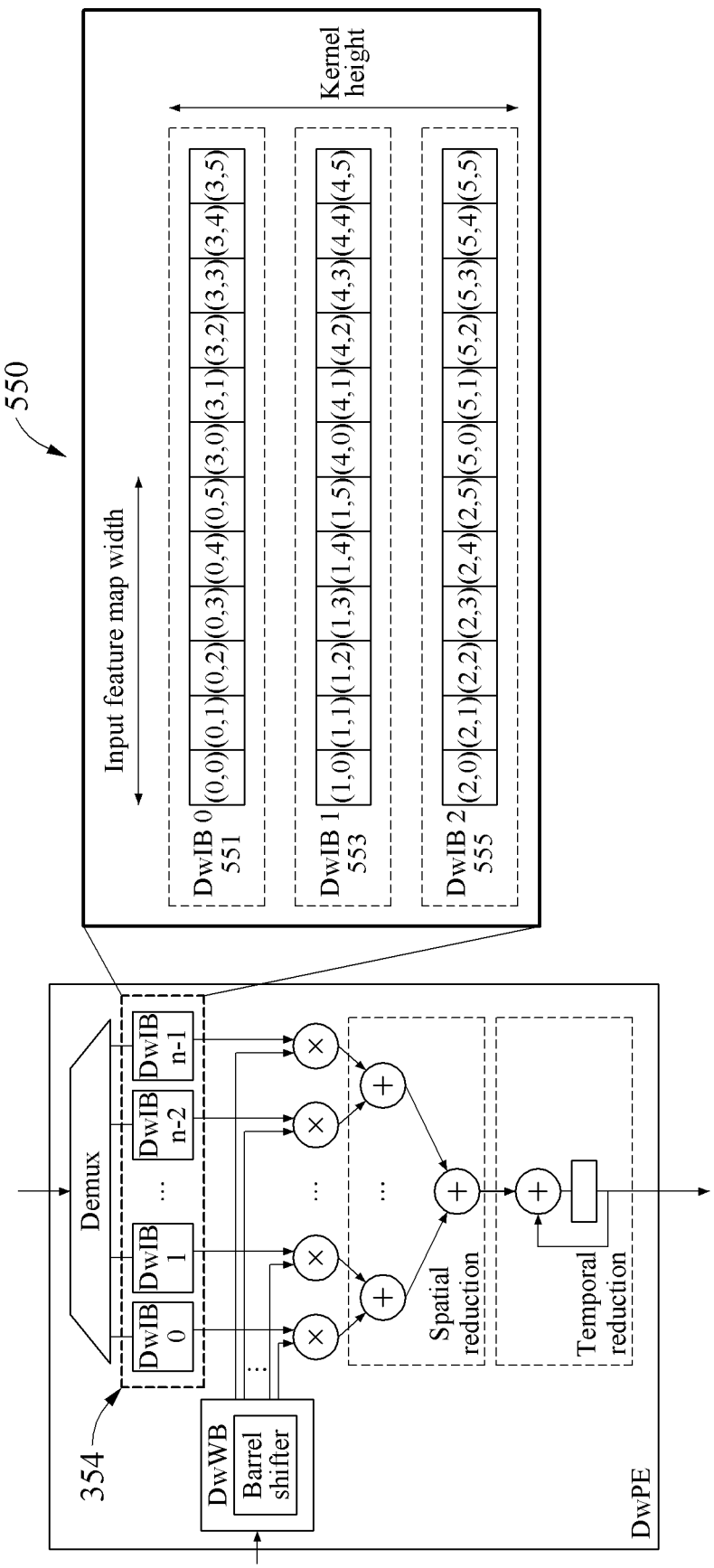

FIGS. 5A and 5B illustrate examples of a process of storing an input feature map in a depth-wise weight buffer DwIB during a depth-wise convolution operation, in accordance with one or more embodiments. In the following examples of FIGS. 5A to 7, three depth-wise weight buffers DwIB and three multipliers may be assumed to be included in an accelerator DwPE.

Referring to FIG. 5A, FIG. 5A illustrates an input feature map 510, a weight kernel 520, and an output feature map 530 for a depth-wise convolution operation. The input feature map 510 may have a size of "6×6", and the weight kernel 520 may have a size of "3×3". Also, the output feature map 530 may have a size of "4×4".

FIG. 5B illustrates a result obtained by storing the input feature map 510 in "n" depth-wise weight buffers DwIB 354 of an accelerator DwPE for the depth-wise convolution operation, in accordance with one or more embodiments.

Since "m" accelerators DwPE included in an accelerator set DwCU 350 operate, for example, using a lockstep scheme, position information other than a channel of a feature map may be used equally in all the accelerators DwPE. The lockstep scheme may correspond to a scheme of processing the same set of operations at the same time in parallel.

Although an operation in a single accelerator DwPE is mainly described for convenience of description, the other individual accelerators may also operate similarly to the accelerator DwPE.

In the above assumption, to use the three multipliers in the accelerator DwPE, elements of the input feature map 510 may need to be obtained in parallel from all depth-wise weight buffers DwIB 550 for each cycle.

The accelerator DwPE may process a first row of the weight kernel 520 in two-dimension (2D) with the size of "3×3" first of all the other rows. Thus, the depth-wise weight buffer DwIB 550 may sequentially store elements (for example, (0,0), (1,0), and (2,0)) of the input feature map 510 that perform an operation with elements of the first row of the weight kernel 520 in DwIB 0 551, DwIB 1 553, and DwIB 2 555.

Subsequently, the depth-wise weight buffer DwIB 550 may sequentially store elements (for example, (0,1), (1,1), and (2,1)) of the input feature map 510 that perform an operation with elements of a second row of the weight kernel 520 in DwIB 0 551 to DwIB 2 555 again.

The depth-wise weight buffer DwIB 550 may sequentially store elements (for example, (0,2), (1,2), and (2,2)) of the input feature map 510 that perform an operation with elements of a third row of the weight kernel 520 in DwIB 0 551 to DwIB 2 555.

When the above nine elements of the input feature map 510 are sequentially stored in the DwIB 0 551, DwIB 1 553, and DwIB 2 555 of the depth-wise weight buffer DwIB 550, the accelerator DwPE may perform one depth-wise convolution operation. When the nine elements of the input feature map 510 are stored, the accelerator DwPE may store next elements of the input feature map 510 based on a sliding window scheme used in a convolution operation.

In an example, when the sliding window scheme is performed, a sliding window may be assumed to move to a column by a height of the weight kernel 520 after traversing from left to right first.

In an example, for a first operation, the accelerator DwPE may store the nine elements (for example, elements (0,0) to (2,2)) of the input feature map 510 in the depth-wise weight buffer DwIB 550. For a next operation, the accelerator DwPE may store next nine elements (for example, elements (0,1) to (2,3)) of the input feature map 510 in the depth-wise weight buffer DwIB 550. In this example, six elements (0,1) to (2,2) may be stored in advance in the depth-wise weight buffer DwIB 550 for the first operation. The accelerator DwPE may sequentially store three elements (for example, (0,3), (1,3), and (2,3)) of a fourth column of the input feature map 510 in three depth-wise weight buffers DwIB 0 551, DwIB 1 553, and DwIB 2 555, respectively.

The accelerator DwPE may store the same number of elements of the input feature map 510 as a number of widths of the input feature map 510, may move a column downwards by a height of the weight kernel 520, and may store elements of the input feature map 510 in the depth-wise weight buffer DwIB 550 in the same manner as described above.

The accelerator DwPE may store elements (for example, (0,5), (1,5), (2,5)) of the input feature map 510, and may sequentially store next elements (for example, (3,0), (4,0), (5,0)) in the three depth-wise weight buffers DwIB 0 551, DwIB 1 553, and DwIB 2 555, respectively.

Figure 6:
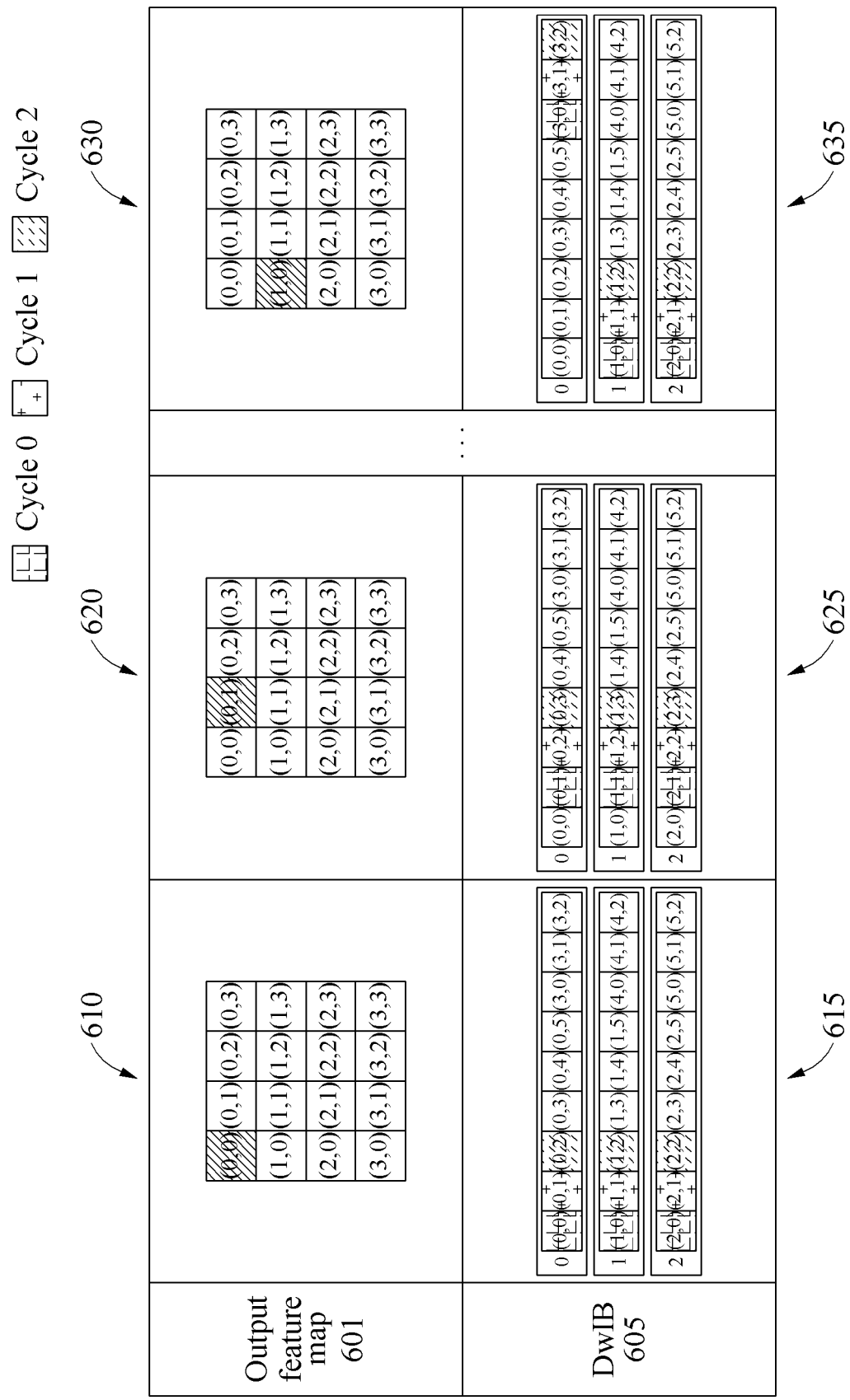
FIG. 6 illustrates an example pattern of a feature map read from a depth-wise weight buffer DwIB for a depth-wise convolution operation, in accordance with one or more embodiments.

FIG. 6 illustrates an example pattern of a feature map read from a depth-wise weight buffer DwIB for a depth-wise convolution operation, in accordance with one or more embodiments.

Referring to FIG. 6, FIG. 6 illustrates a result obtained by reading elements of an input feature map stored in a depth-wise weight buffer DwIB 605 for each cycle when a depth-wise convolution operation of elements of an output feature map 601 existing in various positions is performed.

In an example, a weight kernel may have a size of "3×3" and three multipliers may be used, and accordingly three cycles may be used to perform a single depth-wise convolution operation. To distinguish between accesses to the depth-wise weight buffer DwIB 605 every cycle, cycles 0, 1, and 2 may be indicated by , ▨ ▢ , and ▧, respectively.

In an example, to obtain an element (0,0) of an output feature map 610, nine elements (for example, the elements (0,0) to (2,2) of the input feature map 510) of the input feature map may be used. In this example, three depth-wise weight buffers DwIB may be one-to-one mapped to three multipliers. Thus, to use all three multipliers, elements of the input feature map may need to be read from different depth-wise weight buffers DwIB. Since data used for a single operation at a predetermined moment may be stored in different depth-wise weight buffers DwIB, the depth-wise weight buffers DwIB may supply input feature maps to all multipliers for each cycle.

An individual accelerator may use all depth-wise weight buffers DwIB to store elements of the input feature map in the depth-wise weight buffers DwIB. Accordingly, the individual accelerator may read elements (0,0), (1,0), and (2,0) for the cycle 0, elements (0,1), (1,1), and (2,1) for the cycle 1, and elements (0,2), (1,2), and (2,2) for the cycle 2 in parallel from different depth-wise weight buffers DwIB, and may perform an operation with multipliers.

Since an element (0,1) of an output feature map 620 is obtained based on a sliding window scheme, the individual accelerator may read the used elements (0,1) to (2,2) in parallel from different depth-wise weight buffers DwIB, as indicated by reference numeral 615, and may additionally read elements (0,3), (1,3), and (2,3) as indicated by reference numeral 625, to perform a convolution operation.

To obtain an element (1,0) of an output feature map 630, "3×3" elements of an input feature map that are one row below an element (0,0) may be used. An address at which data is stored in the depth-wise weight buffer DwIB 605 may be represented in one dimension (1D). Accordingly, an element (3,0) of the input feature map may be stored at an address next to an element (0,5), as indicated by reference numeral 635. Thus, an element (1,0) of the input feature map multiplied by a weight kernel of an element (0, 0) of the output feature map 630 may be read from DwIB 1, however, the element (3,0) of the input feature map multiplied by an element (2,0) of the output feature map 630 may be read from DwIB 0. As described above, all the three depth-wise weight buffers DwIB and the three multipliers may be used to perform a convolution operation.

In an example, data may be stored in depth-wise weight buffers DwIB that are distributed scratchpads through the above-described method without a duplication of an additional input feature map, and a situation in which a depth-wise weight buffer DwIB at the same position is accessed every cycle may not occur.

Figure 7:
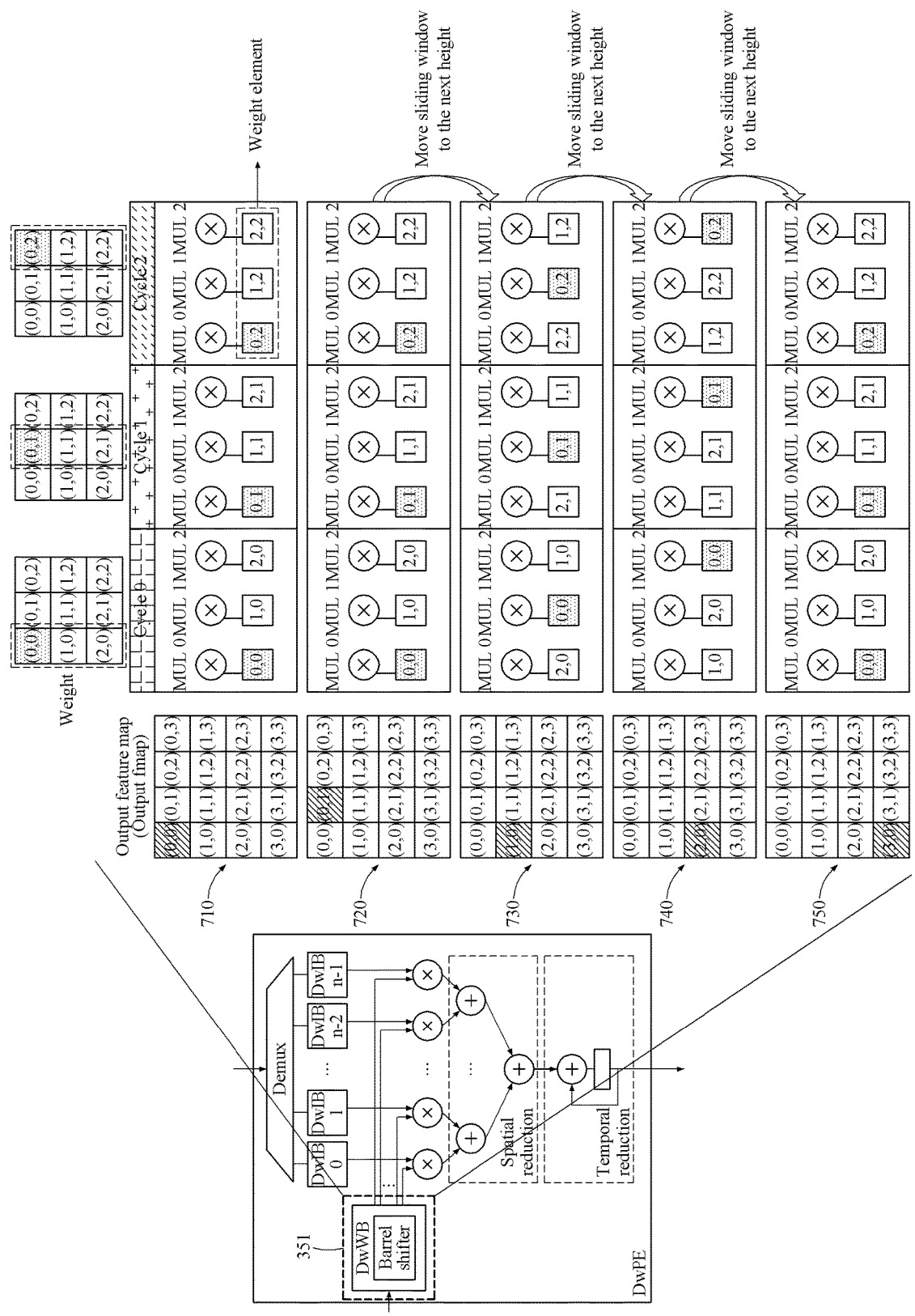
FIG. 7 illustrates an example pattern of a weight read from a depth-wise weight buffer DwIB for a depth-wise convolution operation, in accordance with one or more embodiments.

FIG. 7 illustrates an example pattern of a weight read from a depth-wise weight buffer DwIB for a depth-wise convolution operation, in accordance with one or more embodiments. FIG. 7 illustrates elements of a weight kernel assigned to multipliers MUL for each cycle when a depth-wise convolution operation is performed on elements of an output feature map existing in various positions.

A position value indicated by ▨ in FIG. 7 may represent an element of an output feature map that is currently computed, and a position value written in a box in cycles 0, 1, and 2 may represent a weight element (for example, the weight kernel 520 of FIG. 5A) that is being used.

A shaded weight element for each cycle in a weight kernel with a size of "3×3" may represent weight elements used as a criterion to show which multiplier the weight element is assigned according to a position of an element of an output feature map.

In an example, as indicated by reference numerals 710 and 720, when elements (0,0) and (0,1) of an output feature map existing in a column at the same position are obtained, positions of weight elements may not change.

As indicated by reference numeral 730, when an element (1,0) of an output feature map existing one row below is obtained, a weight element may move to the right by a changed position (one row) for each cycle. The above scheme may also be applied to an example in which an element an element (2,0) of an output feature map existing one row below is obtained as indicated by reference numeral 740.

In an example, to use a weight kernel with a size of "3×3", and to process an element (3,0) of an output feature map, as indicated by reference numeral 750, a position may be changed four times in a horizontal column direction. Accordingly, elements of the weight kernel may be arranged back again, so that a convolution operation may be performed.

In an example, an element of a weight kernel may be shifted by the above-described barrel shifter, and thus it is possible to read the element of the weight kernel according to a position of a column.

Figure 8A:
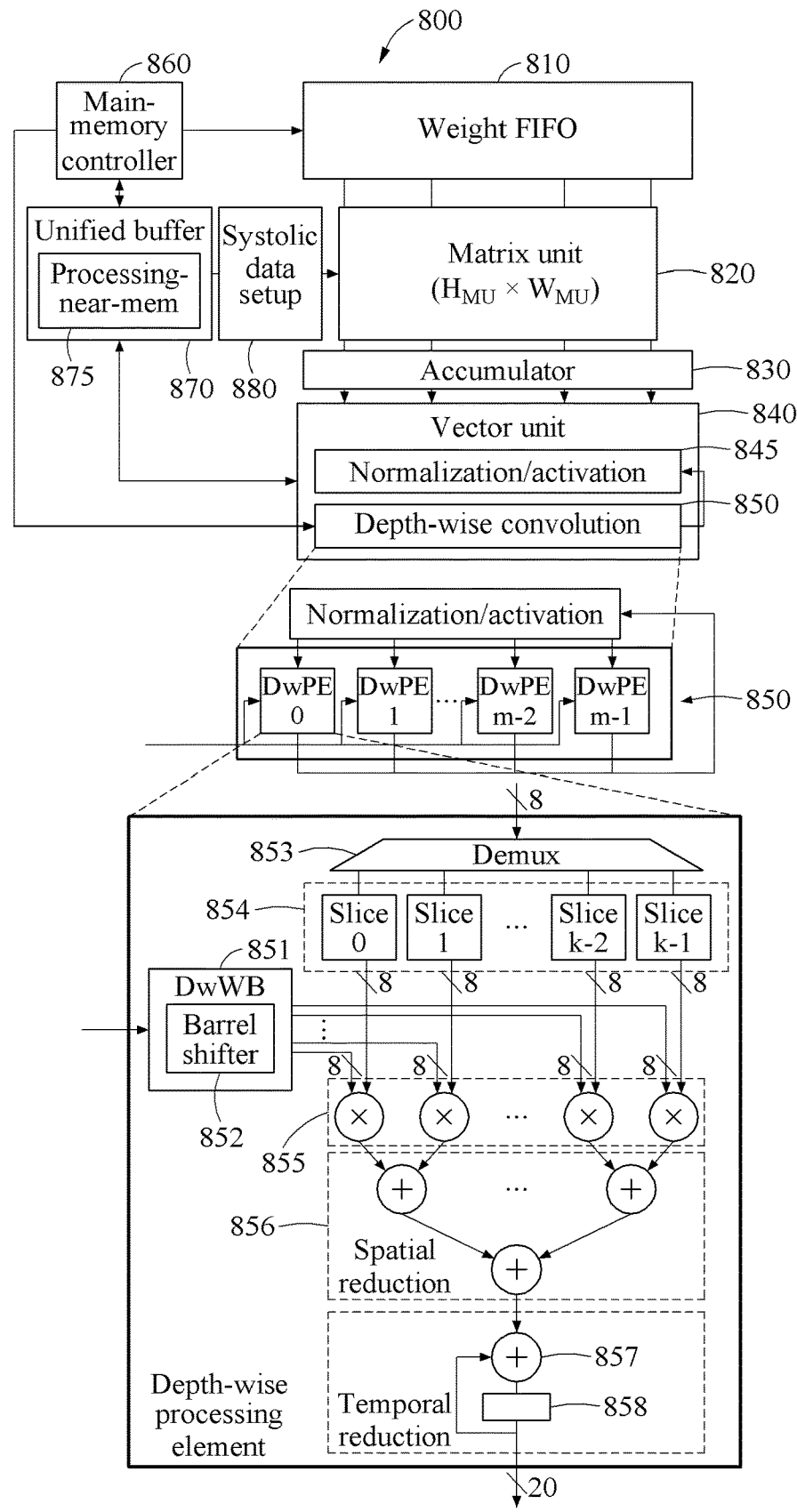
FIGS. 8A and 8B illustrate another example structure of an example neural processor, in accordance with one or more embodiments.
Figure 8B:
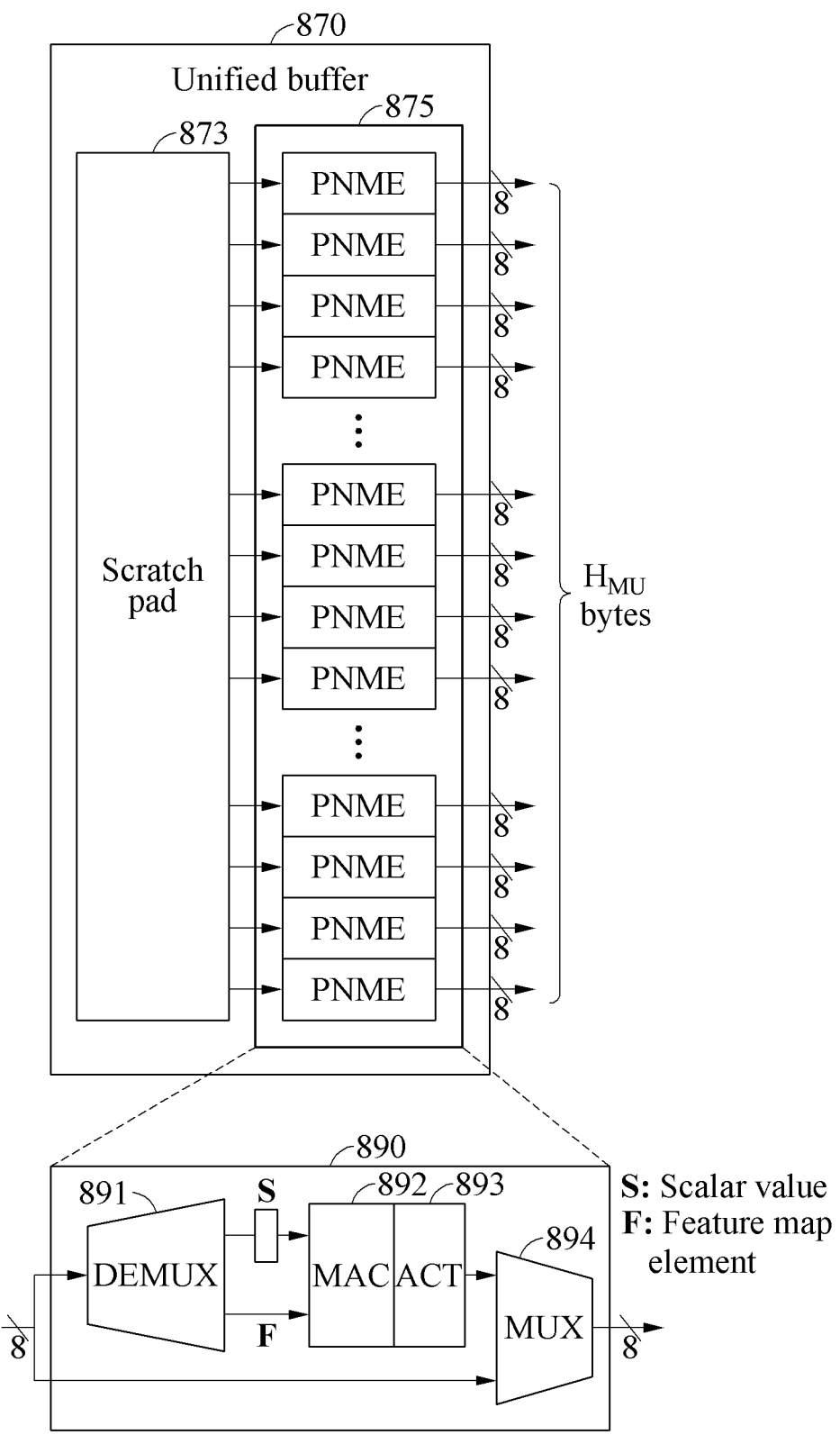

FIGS. 8A and 8B illustrate another example of a structure of an example neural processor, in accordance with one or more embodiments. FIGS. 8A and 8B illustrate a structure of an example neural processor 800.

Referring to FIG. 8A, a weight FIFO 810, a matrix device or unit MU 820, an accumulator ACC 830, a normalization and activation vector device or unit 845, a depth-wise convolution vector device or unit 840, a main-memory interface 860, a UB 870, and a systolic data setup module 880 of the neural processor 800 may respectively correspond to the weight FIFO 310, the matrix device or unit MU 320, the accumulator ACC 330, the ANP module 340, the accelerators 350, the main-memory interface 360, the UB 370, and the systolic data setup module 380 of the neural processor 300 of FIG. 3. Accordingly, further description of operations of the weight FIFO 810, the matrix device or unit MU 820, the accumulator ACC 830, the normalization and activation vector device or unit 845, the depth-wise convolution vector device or unit 840, the main-memory interface 860, the UB 870, and the systolic data setup module 880 is not repeated herein. Hereinafter, the neural processor 800 will be described based on a difference in configurations and operations with the neural processor 300.

The neural processor 800 may efficiently process both computing-intensive and memory-intensive CNN layers and functions with a minimal area overhead. The matrix device or unit MU 820 may perform, for example, a standard convolution operation or a point-wise convolution Pw-CONV operation. Hereinafter, an example in which the matrix device or unit MU 820 outputs a result of a point-wise convolution Pw-CONV operation will be described, however, an example in which the matrix device or unit MU 820 performs a standard convolution operation is not excluded.

The depth-wise convolution vector device or unit 840 of FIG. 8A may correspond to the ANP module 340 and the accelerators 350 of FIG. 3. The depth-wise convolution vector device or unit 840 may be divided into the normalization and activation vector device or unit 845 (hereinafter, referred to as "VU-NA") and a vector device or unit 850 for a depth-wise convolution Dw-CONV operation (hereinafter, referred to as "VU-D"). The depth-wise convolution vector device or unit 840 and the UB 870 may be bidirectionally connected.

The VU-NA 845 may correspond to the ANP module 340 of FIG. 3, and the VU-D 850 may correspond to the accelerators 350.

The VU-D 850 may take an output feature map from the matrix device or unit MU 820 through the VU-NA 845 and may perform a depth-wise convolution operation in a pipelined manner. When a depth-wise convolution layer does not follow a point-wise convolution layer Pw-CONV, the output feature map may be transferred directly to the UB 870 by bypassing the VU-D 850.

Since lanes of the matrix device or unit MU 820 may process only an output channel, a single depth-wise processing element DwPE may be disposed in each of the lanes of the matrix device or unit MU 820. Each depth-wise processing element DwPE may include a depth-wise weight buffer DwWB 851, a barrel shifter 852, a DeMUX 853, a depth-wise input feature map buffer DwIB 854, "k" depth-wise multipliers DwMUL 855, an adder tree 856 for a partial reduction, and a register for accumulation including an adder 857 and a latch 858. The register including the adder 857 and the latch 858 may be used for a temporal reduction.

Each of the depth-wise multipliers DwMUL 855 may take operands from the depth-wise input feature map buffer DwIB 854 and the depth-wise weight buffer DwWB 851, may multiply the operands and may transmit an output to the adder tree 856.

The depth-wise input feature map buffer DwIB 854 may be a buffer for an input feature map of a depth-wise convolution. The depth-wise input feature map buffer DwIB 854 may include "k" slices. The "k" slices may be one-to-one mapped to the depth-wise multipliers DwMUL 855. Also, each of the "k" slices may be a register file with a word size of 1 byte, and accordingly each of the depth-wise multipliers DwMUL 855 may simultaneously access a row of an SRAM cell of the depth-wise input feature map buffer DwIB 854.

In the depth-wise weight buffer DwWB 851, weights may be reused with repeating but shuffled patterns to be aligned with element values of an input feature map to be multiplied at the depth-wise multipliers DwMUL 855. The depth-wise weight buffer DwWB 851 may include the barrel shifter 852 and a small register file (not shown).

The VU-D 850 may include a CNN model that performs a relatively simple pooling operation such as global average pooling that reduces a number of features to allow the features to be a 1D vector.

A processing near memory unit, hereinafter referred to as "PNMU", 875 may execute simple element-wise operations that are performed prior to a convolution operation. The PNMU 875 may correspond, as a non-limiting example, to a preprocessing device of the UB 870.

An operation of the PNMU 875 may be pipelined with a subsequent convolution operation, thereby hiding an execution time of the neural processor 800 and saving memory accesses.

Referring to FIG. 8B, the PNMU 875 may include processing near memory elements (hereinafter, referred to as "PNMEs") with $H_{MU}$ bytes, and each of the PNMEs may be disposed between a row of the UB 870 and the matrix device or unit MU 820. The PNMU 875 may be connected to a scratchpad 873 of the UB 870.

A PNME 890 may include a DeMUX 891, a MAC 892, a comparator 893 for ReLU, a MUX 894, and a small register (not shown) including a scale factor used in a scaling operation such as scaling or normalization. The DeMUX 891 may select a scale factor or an element of an input feature map.

Since the PNME 890 is an activation ACT function, logics for activation types may occupy a large area. The PNME 890 may support a ReLU layer. The MUX 894 may determine whether to use preprocessing.

Figure 9C:
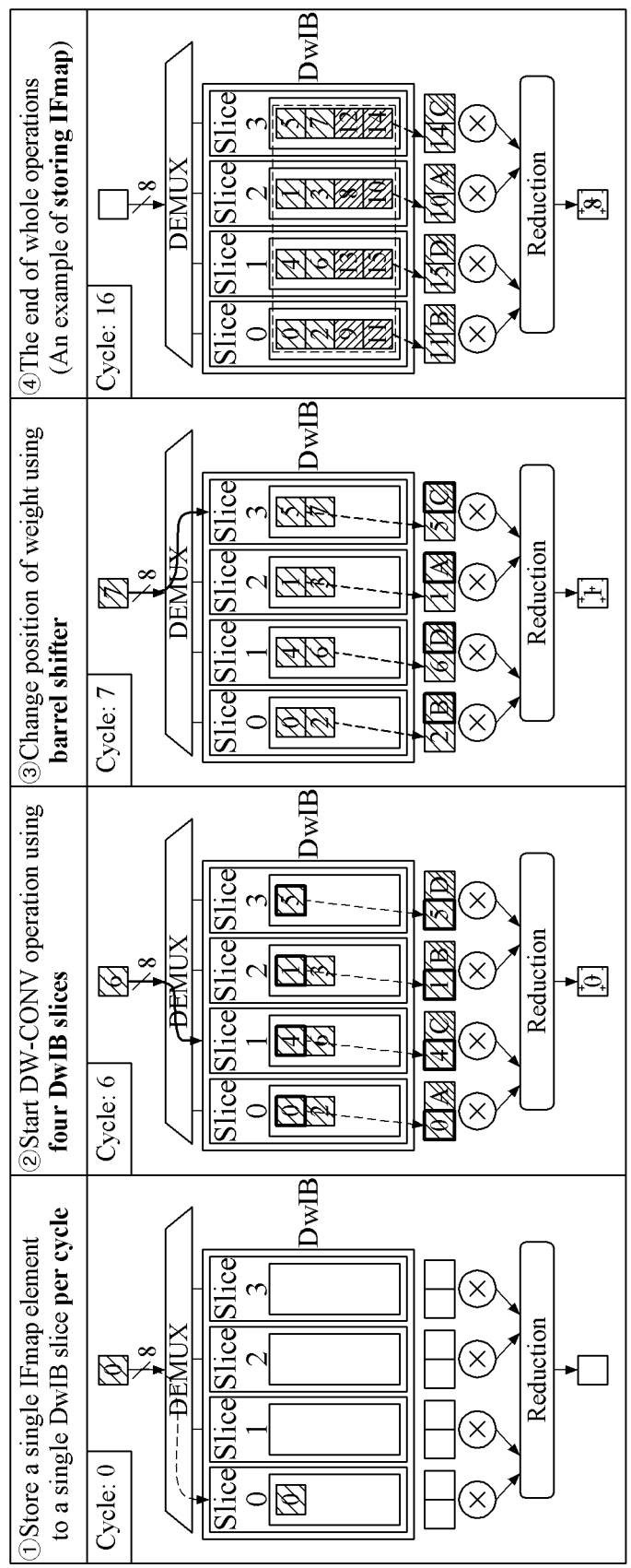

FIGS. 9A to 9C illustrate an example operation of a depth-wise processing element DwPE, in accordance with one or more embodiments. FIGS. 9A to 9C illustrate a process in which a depth-wise processing element DwPE operates when four depth-wise multipliers DwMUL and four slices of a depth-wise input feature map buffer DwIB are provided.

The depth-wise processing element DwPE may perform the same operation on an independent feature map, and accordingly an example of an operation of a single depth-wise processing element DwPE will be described below.

Referring to FIG. 9A, FIG. 9A illustrates a result obtained by the depth-wise processing element DwPE performing a depth-wise convolution operation through a depth-wise convolution layer with a stride of "1" and without zero padding. In this example, an input feature map may have a size of "4×4", a weight kernel may have a size of "2×2", and an output feature map may have a size of "3×3". In an example, each feature map may be in a form of convolution (Cony) tiles with a size of "$T_{NW} \times T_{IH} \times T_{IC}$".

FIG. 9B illustrates a data movement status according to an input/output (I/O) of the depth-wise processing element DwPE at each cycle. In an example, a result of the above-described point-wise convolution Pw-CONV operation, normalization and activation may be transmitted to the depth-wise processing element DwPE for each cycle. In this example, a number IC of IFmap channels in a previous point-wise convolution Pw-CONV operation may be assumed to be less than $H_{MU}$.

FIG. 9C illustrates a process in which the depth-wise processing element DwPE internally operates in a predetermined cycle. Reading/writing of a depth-wise input feature map buffer DwIB may be assumed to spend one cycle.

In ① of FIG. 9C, a vector device or unit VU-NA that performs normalization and activation may receive elements of an output feature map according to a point-wise convolution from a matrix device and an accumulator, and may perform BN and activation ACT. The vector device or unit VU-NA that performs normalization and activation may transmit a result obtained by performing the normalization and the activation to the depth-wise processing element DwPE through each lane for each cycle. The depth-wise processing element DwPE may take elements of an input feature map IFmap, and may store the elements in a depth-wise input feature map buffer DwIB.

At a cycle 0, the depth-wise input feature map buffer DwIB may store an element of the input feature map in one of the four slices. The element of the input feature map stored in the slice may be, for example, an element of an output feature map corresponding to a result of a point-wise convolution operation of the matrix device.

At cycles 0 to 5, the depth-wise processing element DwPE may wait until all elements (elements of the input feature map) are received in a convolution window by performing normalization NORM and activation ACT of a point-wise convolution operation. In both a depth-wise convolution operation and a point-wise convolution operation, the convolution window may proceed first in a row direction.

The depth-wise processing element DwPE may perform a convolution operation for all cycles 6 to 16.

In comparison to a reference systolic array that performs a depth-wise convolution in the matrix device or unit, the depth-wise processing element DwPE may provide up to 4× memory bandwidth due to the four slices of the depth-wise input feature map buffer DwIB. To completely utilize all slices of the depth-wise input feature map buffer DwIB at every cycle, the depth-wise processing element DwPE may place an element of each input feature map of a convolution window in an appropriate slice of the depth-wise input feature map buffer DwIB.

In ② of FIG. 9C, a first convolution window may include elements of an input feature map numbered or indexed as 0, 4, 1, and 5. The above four elements may be distributed in a column-major order into a first row of the four slices of the depth-wise input feature map buffer DwIB. Next elements of the input feature map numbered as 2, 6, and 3 may be sequentially stored in slices 0, 1, and 2. The depth-wise processing element DwPE may load the elements 0, 4, 1, and 5 of the input feature map from each slice of the depth-wise input feature map buffer DwIB, may multiply the elements by corresponding weight elements of a weight kernel, and may sum an output, to calculate an element 0 of the output feature map.

In ③ of FIG. 9C, the convolution window may move to the right by "1", and accordingly a corresponding weight element and an element of the input feature map may change.

Indices of elements of the input feature map in the slices of the depth-wise input feature map buffer DwIB may be different between the slices of the depth-wise input feature map buffer DwIB. Each depth-wise multiplier DwMUL may independently load an element of the input feature map from a slice of the depth-wise input feature map buffer DwIB. A weight element of the weight kernel may be reused for all elements of an output feature map, and accordingly a barrel shifter may rearrange weights. At a cycle 7, the barrel shifter may shift a weight to the right by 2.

The above-described data access pattern may be repeated until "16" cycles for a depth-wise convolution operation are terminated in the depth-wise processing element DwPE.

For example, in ④ of FIG. 9C, a stride may be assumed to be greater than "1".

In this example, a DeMUX for storing the input feature map in a slice of the depth-wise input feature map buffer DwIB may operate in the same manner as an example in which the stride is "1". Also, a pattern of loading the input feature map to a depth-wise multiplier DwMUL may not change.

In an example, when the stride is "2", the input feature map may be loaded in the same way as cycles 6, 8, 14, and 16 of FIG. 9B. When the convolution window moves in a row direction, the barrel shifter may not change a position of a weight. When the convolution window moves in a column direction, the barrel shifter may shift a weight by "2".

In an example, due to a simple access pattern as described above, the depth-wise processing element DwPE may be flexibly configured to support various sizes of weight kernels and a number of depth-wise multipliers DwMUL while fully utilizing a convolution reuse of the input feature map.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-9C, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural processor, comprising:
a matrix device configured to generate an output feature map by processing a standard convolution operation, the matrix device configured to have a systolic array architecture; and
accelerators, configured to process depth-wise convolution operations for each of elements of the output feature map corresponding to lanes of the matrix device.

2. The neural processor of claim 1, wherein the output feature map generated by the standard convolution operation is provided as an input to the accelerators in a pipelined manner to perform the depth-wise convolution operations.

3. The neural processor of claim 1, wherein each of the accelerators is configured to perform the depth-wise convolution operations in parallel for each of the elements of the output feature map that are output for each of the lanes corresponding to columns of the matrix device.

4. The neural processor of claim 1, wherein the accelerators are configured to operate by implementing a lockstep scheme of processing a same set of operations at a same time in parallel.

5. The neural processor of claim 1, wherein the accelerators respectively correspond to the lanes of the matrix device.

6. The neural processor of claim 1, wherein each of the accelerators comprises:
a plurality of multipliers;
a plurality of depth-wise input feature map buffers, configured to store the output feature map for the depth-wise convolution operations; and
a depth-wise weight buffer, configured to store weights for the depth-wise convolution operations.

7. The neural processor of claim 6, wherein the plurality of multipliers are configured to:
perform a multiplication operation for the depth-wise convolution operations based on the output feature map received from the plurality of depth-wise input feature map buffers and the weights received from the depth-wise weight buffer; and
transmit a result of the multiplication operation to first adders included in the adder-tree structure.

8. The neural processor of claim 6, wherein each of the accelerators further comprises:
a second adder, configured to collect a multiplication operation result of the plurality of multipliers; and
a latch, configured to store values collected in the second adder.

9. The neural processor of claim 6, wherein the plurality of depth-wise input feature map buffers are configured to be one-to-one connected to the plurality of multipliers.

10. The neural processor of claim 6, wherein the depth-wise weight buffer is configured to read the weights directly from a memory through a memory interface and to simultaneously store and process the weights by a double buffering scheme.

11. The neural processor of claim 6, wherein:
the depth-wise weight buffer comprises a barrel shifter, configured to shift a position of the weights, and
the depth-wise weight buffer is configured to map an element of the output feature map and an element of the weights to the plurality of multipliers with the barrel shifter.

12. The neural processor of claim 1, further comprising:
an accumulator, configured to store the elements of the output feature map generated by the matrix device.

13. The neural processor of claim 1, wherein the matrix device further comprises a postprocessing module, configured to perform at least one postprocessing operation among an activation operation, a normalization operation, and a pooling operation on the elements of the output feature map.

14. The neural processor of claim 1, wherein the accelerators are configured to have an adder-tree structure.

15. A processor-implemented neural network method, the method comprising:
generating, with a matrix device having a systolic array architecture, an output feature map by processing a standard convolution operation;
processing, with accelerators, depth-wise convolution operations for each of elements of the output feature map corresponding to lanes of the matrix device; and
providing the generated output feature map as an input to the accelerators to perform the depth-wise convolution operations.

16. The method of claim 15, further comprising processing the depth-wise convolution operations with adders included in an adder tree structure of the accelerators.

17. The method of claim 15, further comprising performing the depth-wise convolution operations in parallel for each of the elements of the output feature map that are output for each of the lanes corresponding to columns of the matrix device.

18. The method of claim 15, further comprising performing at least one postprocessing operation among an activation operation, a normalization operation, and a pooling operation on the elements of the output feature map.

* * * * *